(12) United States Patent
Mazaudier

(10) Patent No.: US 9,533,816 B2
(45) Date of Patent: Jan. 3, 2017

(54) REACTION CHAMBER FOR EXOTHERMIC MATERIAL

(75) Inventor: Fabrice Mazaudier, Manosque (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 328 days.

(21) Appl. No.: 13/704,953

(22) PCT Filed: Jun. 9, 2011

(86) PCT No.: PCT/EP2011/059609
§ 371 (c)(1),
(2), (4) Date: Jan. 4, 2013

(87) PCT Pub. No.: WO2011/157628
PCT Pub. Date: Dec. 22, 2011

(65) Prior Publication Data
US 2013/0101470 A1    Apr. 25, 2013

(30) Foreign Application Priority Data

Jun. 16, 2010 (FR) .................................. 10 54752

(51) Int. Cl.
*G21F 9/00* (2006.01)
*G21F 9/28* (2006.01)
(Continued)

(52) U.S. Cl.
CPC .............. *B65D 81/18* (2013.01); *G21C 3/623* (2013.01); *G21F 9/28* (2013.01); *G21F 9/30* (2013.01); *Y02E 30/38* (2013.01)

(58) Field of Classification Search
CPC ............ B01J 20/00; B01J 20/02; B01J 20/04; B01J 20/043; B65D 81/18; B65D 81/00; G21C 3/42; G21C 3/58; G21C 3/62; G21C 3/623; G21F 9/28; G21F 9/30; G21F 9/00; Y02E 30/30; Y02E 30/38

See application file for complete search history.

(56) References Cited

U.S. PATENT DOCUMENTS 3,073,768 A * 1/1963 Richmond ................ G21G 4/02
266/905
5,509,362 A * 4/1996 Lyon ............................. 110/345
(Continued)

FOREIGN PATENT DOCUMENTS

FR     2376215 A  *  9/1978
FR     2752234 A1    2/1998
(Continued)

OTHER PUBLICATIONS

Machine translation of FR2376215 A, which was published Sep. 1, 1978.*
(Continued)

*Primary Examiner* — Natasha Young
(74) *Attorney, Agent, or Firm* — Baker Hostetler LLP

(57) ABSTRACT

A chamber for reacting exothermic material is disclosed, the chamber comprising a multilevel structure including at least: a receptacle for storing the material, corresponding to a lower level; a median level comprising a reactive load containing at least one alkaline-earth carbonate, so as to absorb heat emitted during the oxidation reaction of the material, the alkaline-earth carbonate decomposing under the effect of the heat in an endothermic reaction; an upper level comprising a cover. Optionally, the material stored is a carbide of plutonium and/or uranium.

17 Claims, 2 Drawing Sheets

(51) Int. Cl.
*G21F 9/30* (2006.01)
*G21C 3/62* (2006.01)
*B65D 81/18* (2006.01)
*B01J 20/00* (2006.01)
*B01J 20/02* (2006.01)
*B01J 20/04* (2006.01)
*G21C 3/00* (2006.01)
*G21C 3/42* (2006.01)
*G21C 3/58* (2006.01)
*B65D 81/00* (2006.01)

(56) References Cited

U.S. PATENT DOCUMENTS

| | | | | |
|---|---|---|---|---|
| 5,837,136 | A | * 11/1998 | Lee | C02F 1/5236 106/488 |
| 6,166,390 | A | * 12/2000 | Quapp et al. | 250/506.1 |
| 6,451,274 | B1 | * 9/2002 | Koizumi | C01B 7/191 422/139 |

FOREIGN PATENT DOCUMENTS

| | | | |
|---|---|---|---|
| FR | 2768550 A1 | 3/1999 | |
| JP | 04-204100 A | * 7/1992 | ............... G21F 9/30 |
| JP | 2001-002420 A | 1/2001 | |
| KR | 19990024357 A | * 4/1999 | |

OTHER PUBLICATIONS

Machine translation of KR1999-0024357 A, which was published Apr. 6, 1999.*

B.D. Chattaraj, et al., "Studlies on the Thermal Decomposition of Calcium Carbonate in the Presence of Alkali Salts", Journal of Thermal Analysis, 1973, pp. 43-49, vol. 5.

J.M. Criado, et al., "Influence of the Mechanical Treatment on the Structure and the Thermal Stability of Alkaline-Earth Carbonates", Journal of Materials Science, 2004, pp. 5189-5193, vol. 39.

S. Maitra, et al., "Decomposition Kinetics of Alkaline Earth Carbonates by Integral approximation Method", Ceramica, 2008, pp. 268-272, vol. 54.

Said Slaoui, et al., "Etude Experimentale et Modelisation de la Cinetique de Decomposition de la Pierre a Chaux", Comptes Rendus Chimie, 2004, pp. 559-568, vol. 7, Elsevier.

Hongen Wei, et al., "A Study on the Kinetics of Thermal Decomposition of CaCO3", Journal of Thermal Analysis, 1995, pp. 303-320, vol. 45, John Wiley & Sons, Limited.

John P. Sanders, et al., "Kinetic Analyses Using Simultaneous TG/DSC Measurements Part I: Decomposition of Calcium Carbonate in Argon", Thermochimica Acta, 202, pp. 115-128, vol. 388, Elsevier Science B.V.

Office Action in Japanese Patent Application No. 2013-514649, dated Apr. 5, 2016.

* cited by examiner

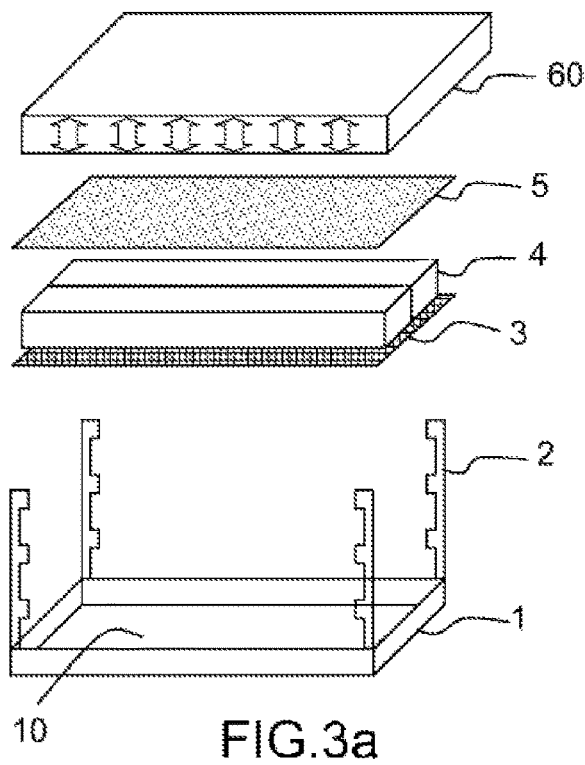
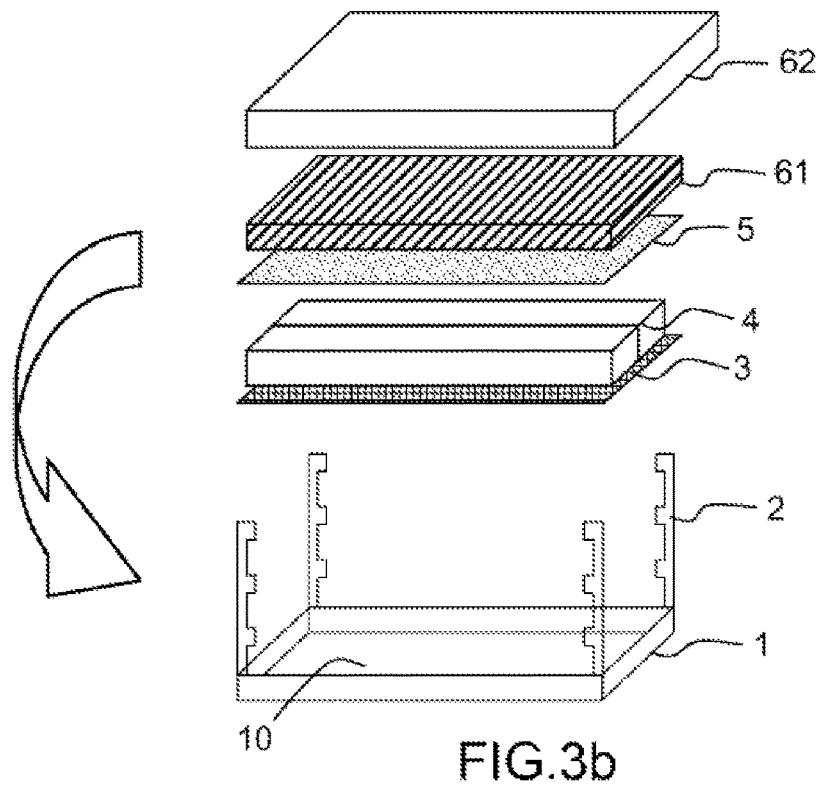

REACTION CHAMBER FOR EXOTHERMIC MATERIAL

This application is a National Stage of International patent application PCT/EP2011/059609, WO 2011/157628, filed on Jun. 9, 2011, which claims priority to foreign French patent application No. FR 1054752, filed on 16, 2010, the disclosures of which are incorporated by reference in their entirety.

FIELD OF THE INVENTION

The field of the invention is that of the engineering of technological processes and devices associated with the control of oxidation reactions of very reactive materials. It more directly/mainly relates to a functionalized reaction chamber for materials reacting in a highly exothermic fashion in the presence of oxygen and therefore requiring management of the risk of thermal runaway.

BACKGROUND

The control of the exothermic oxidation reactions of solid materials is a real problem notably in the nuclear field, in particular in the context of processes for oxidizing nuclear fuels in the form of carbides or nitrides containing plutonium and/or uranium, before storage or stock-piling or before reprocessing by nitric dissolution, or even in the context of management of manufacturing waste produced in the cycle for producing these fuels. These unoxidized, nitride or carbide, nuclear fuels are all highly reactive with oxygen and potentially pyrophoric. Transforming them into oxides may obviate certain chemical risks.

Plutonium-containing carbide fuels (U,Pu)C have a very high affinity for oxygen, which may affect the stability of the product during various manufacturing operations, and the oxidation reaction of these fuels may lead to a highly exothermic thermal runaway according to the following highly exothermic ($\Delta rH \approx -1250$ kJ/mol) reaction:

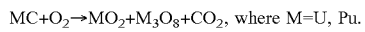

$MC + O_2 \rightarrow MO_2 + M_3O_8 + CO_2$, where M=U, Pu.

For reasons of safety the reaction must be controlled at all times.

Pure or alloyed metallic plutonium may be the material concerned in these oxidation processes. A container allowing the oxidation of plutonium-containing metals to be controlled has already been described in French patent application FR 2 752 234. More precisely, this prior-art container is a multilayer container specifically designed to contain a reactive system that is liable to melt. The confinement chamber consists of at least one sheet made of a first material chosen from tantalum, tungsten and their alloys, this sheet being inserted between at least two sheets made of a second material that does not react with air at the temperatures of the process used; this second material may advantageously be stainless steel.

During the oxidation reaction, this multilayer chamber undergoes very little oxidation and if the plutonium melts and then accidentally spills, and the stainless steel is pierced, the tantalum retains the plutonium, and consequently the chamber produced is safe.

The same type of problem may also be encountered in fields such as the construction field or the field of industrial buildings, for example in functionalized and potentially active roofs or ceilings for warehouses or workshops or cabinets in which very inflammable chemical materials or fuels are stored or worked on.

Generally, in process management, potential runaway of a chemical reaction associated with—or a consequence of—substantial overheating is conventionally managed, manually or automatically, using a set of sensors and feedback. This type of management, although it is effective, firstly relies on a transfer of information from the reactor in which the reactive system is found to the one or more sensors in question, and then to the control/command module, so that in return one or more expected actions can be carried out. This information flow and its management, ensuring the corrective action is implemented, cannot be instantaneous. They also depend on the sensors and all the elements in the information chain operating correctly. Finally, these processes involve an electrical power supply, which even if it is advantageously separate from the power supply nominally used for the process, must be reliable and available, similarly to the system provided a priori for fail-safe management of the neutron reactivity of a nuclear reactor core in the case of runaway, namely control bars and the system allowing them to drop very rapidly so as to absorb the neutrons.

SUMMARY OF THE INVENTION

The Applicant believes it could be appropriate to add, to conventional systems for managing a chemical process, a direct and rapid means of intervening in the reaction in situ, which means is robust by design and does not involve complex or factory-produced sensors or indeed an information network, and which is self-sufficient, i.e. it does not require a power supply.

For this purpose the Applicant proposes a reaction chamber (containing the reactant the reaction, for example the oxidation and exothermicity, of which it is desired to control) the role of which is not limited to a receptacle for the products to be treated. Regarding temperature, this container is associated with a particular function, enabling slowing and even stopping the oxidation reaction and reducing temperature, while aiding removal of heat, in the case of runaway or overheating.

This function relies on the particular nature of the materials making up the chamber and on an arrangement of the various active components present in said container.

More precisely, the subject of the present invention is a chamber for reacting exothermic material, the very structure of the chamber allowing effects relating to high exothermicity to be managed, during the oxidation reaction, especially of plutonium- or uranium-containing carbides, in a robust and self-sufficient way.

More precisely, the subject of the present invention is a chamber for reacting exothermic material, noteworthy in that it comprises a multilevel structure including at least:
  a receptacle for said material, corresponding to a lower level;
  a median level comprising a reactive load containing at least one alkaline-earth carbonate, so as to absorb heat emitted during the oxidation reaction of said material, said alkaline-earth carbonate decomposing under the effect of the heat in an endothermic counter-reaction;
  an upper level comprising a cover.

According to one embodiment of the invention, the alkaline-earth carbonate is $CaCO_3$.

According to one embodiment of the invention, the material treated in this oxidation process is a carbide of plutonium and/or uranium.

According to one embodiment of the invention, the reactive load furthermore comprises a plurality of different types of carbonates, so as to adjust the temperature range of the thermal decomposition of the reactive load.

According to one embodiment of the invention, the reactive load furthermore comprises carbon.

According to one embodiment of the invention, the receptacle of the chamber is made of a refractory metallic material which may be of stainless steel or Inconel type.

According to one embodiment of the invention, the chamber comprises a mesh serving to support the reactive load and sieve it during the decomposition of said load, the reactive load being positioned in contact with said mesh.

According to one embodiment of the invention, the reactive load is a monolithic block positioned on said mesh.

According to one embodiment of the invention, the reactive load is distributed in various slabs positioned on said mesh.

According to one embodiment of the invention, the reactive load is distributed in the form of granules, the particle size of the granules being larger than the size of the apertures in said mesh.

According to one embodiment of the invention, the chamber furthermore comprises a chemically inert intermediate plate providing a seal between the reactive load and the upper level.

According to one embodiment of the invention, the intermediate plate is made of tungsten.

According to one embodiment of the invention, the chamber furthermore comprises means for applying an isostatic pressure to the reactive load.

According to one embodiment of the invention, the means for applying an isostatic pressure to the reactive load are integrated into the upper level and take the form of two plates between which springs are inserted.

According to one embodiment of the invention, the means for applying an isostatic pressure to the reactive load comprise a weight.

According to one embodiment of the invention, the median and upper levels coincide, the chamber comprising two upper shutters securely fastened to the receptacle and capable of closing said chamber, said shutters containing the alkaline-earth carbonate.

BRIEF DESCRIPTION OF THE DRAWINGS

The invention will be better understood and other advantages will become apparent on reading the following description, given by way of nonlimiting example and with reference to the figures, in which:

FIGS. 3a and 3b illustrate two comparable variants of a first exemplary chamber of the invention.

DETAILED DESCRIPTION

The physico-chemical principle of the invention rests on the use of the effects of a chosen chemical reaction, called a "safety" reaction, on the reaction that it is desired to control.

The chemical reaction chosen, or "safety" chemical reaction, is thermal decomposition of alkaline-earth carbonates such as $CaCO_3$ (calcite or even limestone or chalk):

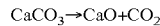

$$CaCO_3 \rightarrow CaO + CO_2$$

The decomposition of $CaCO_3$ is the subject of an abundant literature. It has notably been described in the literature, for example in the articles: J of Thermal Analysis 5 (1973), 43-49; J of Materials Science 39 (2004), 5189-5193; Ceramica 54 (2008), 268-272; C. R. Chimie 7 (004) 559-568; J of Thermal Analysis 45 (1995), 303-310; and Thermochimica Acta 388 (2002) 115-128, that calcite or calcium carbonate $CaCO_3$ decomposes under the effect of temperature and gives rise to two species of different physical and chemical natures, calcium oxide CaO and carbon dioxide $CO_2$.

Figure 1:
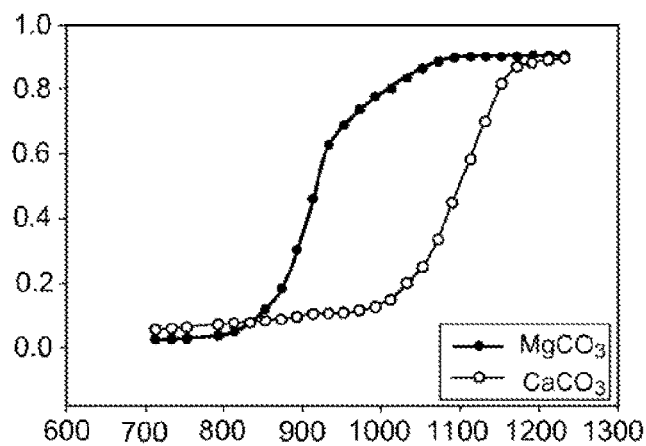
FIG. 1 illustrates the advance of the endothermic chemical decomposition counter-reaction of carbonates as a function of temperature in K.

CaO is a refractory incombustible/uninflammable solid the melting point of which is 2570° C. The chemical reaction is endothermic, i.e. it consumes energy and requires heat to continue: $\Delta H=200$-$233$ kJ/mol. For calcium carbonate $CaCO_3$, the reaction typically occurs at temperatures between 400 and 1000° C., with a rapid increase (sigmoid shape) in the decomposition rate above about 700° C. to 950° C., as illustrated in FIG. 1 and notably described in Ceramica 54 (2008), 268-272, which relates to the kinetics of the reaction of $CaCO_3$ and $MgCO_3$ as a function of temperature. According to the authors the apparent activation energy Ea varies, depending on the test conditions, between 170 and 200 kJ/mol.

This is a rather highly thermally activated reaction. In other words, the temperature and its increase have a strong activating effect on the reaction rate.

$CaCO_3$ has a very high emissivity, $\epsilon=0.96$, in the infrared range, radiation characteristic of heat sources. This emissivity is close to that of black bodies (ideal emitters), which have an emissivity of 1. This property explains in part the capacity of the product to effectively absorb heat radiated from an external source in order to see its temperature increase and thus reach the threshold for thermal decomposition.

It is moreover known that the decomposition of carbonates depends little on the chemical nature of the gas, whether the latter is nitrogen, an inert gas or even air. Only $CO_2$ in substantial quantities (a few tens of percent) has a large influence, due to its direct role in the chemical reaction (the thermal decomposition of $CaCO_3$ is however an equilibrium with a tendency to be rather irreversible).

This thermal decomposition reaction is endothermic; it therefore consumes energy. Its rate greatly increases with temperature: it is quite highly thermally activated.

The amount of energy consumed via the continuing reaction process is proportional to the temperature of the immediate environment.

This endothermic thermal decomposition reaction of the carbonate, shaped into what are called security slabs, occurs above the bed in which the incidental exothermic oxidation reaction that it is desired to control takes place. The endothermic reaction absorbs part of the energy liberated by the oxidation reaction.

It furthermore produces two species in two different physical states: CaO (refractory solid the melting point of which is very high) and $CO_2$ (gas). The carbonate is placed above the level where the oxidation reaction takes place. A second technical effect is obtained: the $CO_2$ gas produced acts to remove heat whereas the solid CaO falls onto the incandescent bed, which corresponds to a third technical effect, depriving the reaction of oxygen by smothering it, as sand does when thrown on a fire. De facto, deprived of oxygen, the oxidation reaction stops or is greatly slowed.

Adjustment salts may be added to the $CaCO_3$ slab, for example halides (NaCl) or alkali-carbonates ($Na_2CO_3$, $K_2CO_3$), in amounts typically of between 1 and 20%, which salts allow the temperature range of the thermal decomposition of the product to be refined/adjusted, to within a few tens of degrees Celsius.

This temperature range precisely corresponds to that targeted in processes for converting mixed uranium and plutonium carbides into oxide.

Generally, the kinetics of this endothermic reaction are chemically controlled (interfacial reaction taking place at the surface of the $CaCO_3$ slab during decomposition). For a constant reaction area, the law governing the behavior (weight loss associated with the departure of $CO_2$) in the isothermic regime is linear (no diffusional limit or reduction in rate).

Under certain conditions, the transfer of heat to the interface may become limiting if the CaO produced does not disintegrate. There is every reason to assist/facilitate its removal, which furthermore has the useful technical effect of smothering/extinguishing the incandescent bed.

This is why the present invention proposes, in certain embodiments of the invention, an optimized chamber structure allowing a loading effect to be generated, in the cover, via a weight or springs (as will be described in greater detail below, regarding exemplary embodiments), and promoting removal of the CaO, allowing it to fall on the incandescent bed (expected technical effect).

The Applicant has observed that a mechanical action greatly facilitates removal of the CaO, whereas, naturally, a shell or skeleton having the shape of the initial carbonate body remains in place. Solid CaO is very friable and disintegrates very easily.

Ensuring the CaO is removed guarantees that a stable stationary linear regime will continue to be observed via chemical control of the interface and that the dynamics of the endothermic reaction will be maintained, which reaction continues at a sustained and continuous rate that is directly proportional to temperature and to reaction area.

The cohesion and apparent density of the $CaCO_3$ slab must nevertheless be chosen so that, under the effect of the heat, the material effectively and gradually disintegrates. If the material is too dense (natural limestone, even marble), then the thermal decomposition occurs more slowly without disintegration, and may leave a porous skeleton after the treatment. In contrast, if the material is not dense enough, then it may disintegrate too rapidly or in an undesirable fashion. It is recommended to preferably shape the $CaCO_3$ by isostatic or uniaxial compression, as for nuclear ceramics, with pressures conventionally of about 100 to 600 MPa, in a preset cycle that in particular depends on the proportion of adjustment salts chosen.

The physical form of the $CaCO_3$ is also important. It is necessary to match it to the area of the incandescent bed that it is desired to protect.

It is well known that the rate of a thermally activated chemical process approximately follows the Arrhenius law:
$k(T)=A \cdot \exp(-Ea/RT)$ where A is a pre-exponential factor called the frequency factor and $k(T)$ is the reaction rate constant.

The apparent activation energy of the oxidation of (U,Pu)C carbides is, comparatively, much lower, since it lies between 10 and 30 kJ/mol according to the results of work carried out by the Applicant.

Figure 2:
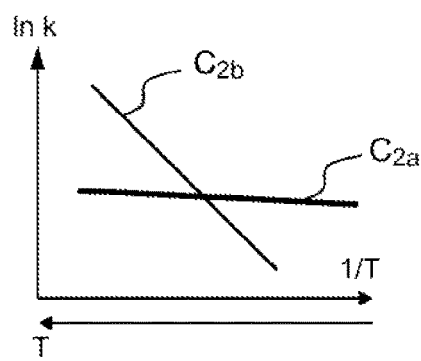
FIG. 2 shows an Arrhenius diagram ln k=f(1/T) illustrating the temperature dependence of the decomposition kinetics of carbonate.

Using a Arrhenius diagram of $\ln k = f(1/T)$, it is easy to deduce that an increase in the temperature of the oxidation reaction does not have a large effect on the oxidation kinetics (experimental demonstration of the low propensity to runaway) and, proportionally, does have a large endothermic effect via activation of the decomposition, as illustrated in FIG. 2.

The curve $C_{2a}$ relates to the exothermic reaction in the case of oxidation of weakly activated (U,Pu)C and the curve $C_{2b}$ relates to the highly thermally activated "safety" endothermic reaction.

It may be advantageous to provide, associated with the $CaCO_3$, in addition to the adjustment salts, activated carbon, the oxidation (slightly exothermic) temperature of which may be modified using an ad hoc treatment.

The advantage of using carbon powder is that it consumes oxygen instead of the plutonium-containing carbide. The extinguishing/smothering technical effect is thus increased via this oxygen consumption.

Moreover, the thermal conductivity of the $CaCO_3$ slab is increased, meaning that it transfers heat more easily, and thus the in situ generation of $CO_2$, concurrently with the disintegration of the slab via volume expansion of the gases produced, is facilitated.

First Exemplary Embodiment of a Reaction Chamber According to the Invention

FIGS. 3a and 3b illustrate a first exemplary functionalized load reaction chamber according to the invention, comprising a receptacle 1 in which the reactive plutonium and/or uranium carbide material 10 intended to be oxidized is placed. This receptacle is equipped with struts 2 allowing adjustment to higher levels.

The chamber comprises two levels, one of which has an adjustable height. The median level contains $CaCO_3$ (safety reaction).

The upper part is placed above the bed of the reaction chamber, held aloft by the feet 2 containing crenellations.

The reaction chamber is made of Inconel or another metallic material that is sufficiently refractory to withstand the temperature of the process for oxidizing the plutonium-containing carbides (typically between 500 and 700° C.) and that is a good thermal conductor in order to evacuate heat to the walls and transfer heat to the carbonate.

The all-metal surrounding of the carbonate slab enables it to be indirectly heated via the good conductivity of the surrounding elements and their thermal load, while radiation directly heats the carbonate since it directly faces the exothermic reaction.

Advantageously, the reaction chamber comprises the $CaCO_3$ material or a mixture of $CaCO_3$ and what are called adjustment salts, these typically comprising other carbonates, allowing the decomposition temperature of the mixture and the characteristics of the endothermic reaction to be adjusted. It may also be beneficial to add carbon to the carbonate or mixture of carbonates, due to its very good thermal conductivity properties, which ensure that heat is more evenly distributed through the slab of $CaCO_3$.

A mesh 3 is provided to support the monolithic slab 4 of carbonate or various individual slabs, or even carbonates in a divided form such as carbonate granules. Specifically, depending on the rapidity desired for the reaction, it may be relatively beneficial to use materials in bulk or divided form. In the case where granules are used, the size of the apertures in the mesh is tailored to the size of said granules so that the latter are contained before decomposition.

The assembly is closed by a cover 60. This cover may, as illustrated in FIG. 3a, consist of two plates between which an array of springs is inserted, so as to apply pressure on the CaCO₃ load. It may typically comprise two stainless steel plates.

According to a comparable variant illustrated in FIG. 3b, the plate-and-spring structure may be replaced by a solid plate 61 made of a material with a high density, such as tungsten.

An intermediate plate 5 providing a "chemical" barrier function is inserted between the cover and the intermediate level containing the CaCO₃ load; this plate may typically be made of an inert material such as stainless steel or Inconel.

Thus, the cover has a function of assisting with the disintegration. By way of a load or of a stress exerted by springs, the plate places the safety slab under pressure, so that when the threshold for thermal decomposition is reached, and the mechanical properties of the slab (which converts into naturally less dense CaO via rupture of the crystal) are concomitantly decreased, the CaO is forced through the mesh so as to rain down on and cover the incandescent bed.

When the slab has completely decomposed, the mesh then directly supports the cover.

Thus according to this exemplary embodiment, the present invention proposes two designs:
- a particular parallelepipedal shape or any other assembly resting on the plate, made of a very dense material, typically a high density metal, for example tungsten, this dense part bearing against a plate making contact with the CaCO₃ slab; and
- a device comprising springs allowing the same action to be exerted.

The plate may have a surface with a relatively marked texture (grooved for example) so as to exert stress on discrete regions of the slab (as opposed, here, to continuously over the entire slab) and promote its disintegration by concentrating the stress.

Second Exemplary Embodiment of a Reaction Chamber According to the Invention

Figure 4:
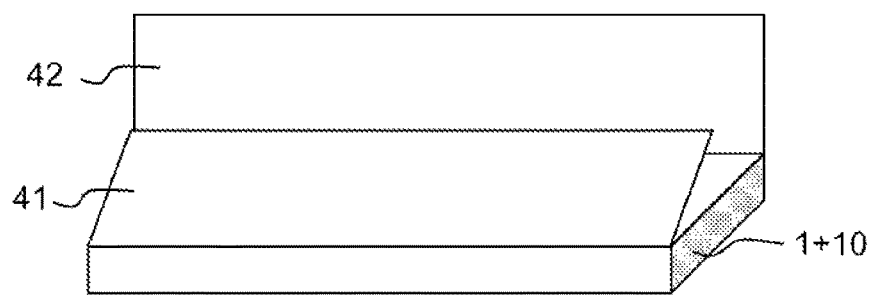
FIG. 4 illustrates a second exemplary chamber according to the invention.

The reaction chamber comprises, as illustrated in FIG. 4, a receptacle part 1, loaded with reactive material 10, closed by two shutters 41 and 42 comprising the CaCO₃ material.

The invention claimed is:

1. A chamber for reacting exothermic oxidation of solid material, comprising a multilevel structure including:
   a receptacle for said solid material, corresponding to a lower level;
   a median level configured to receive heat from an exothermic reaction during oxidation of said solid material in the receptacle, wherein the median level is placed above the receptacle to receive the heat being emitted during the oxidation of the said solid material; wherein the median level comprises a reactive load containing at least one alkaline-earth carbonate slab, or at least one alkaline-earth carbonate in a divided form so as to absorb the heat emitted from the receptacle during the oxidation reaction of said solid material, said alkaline-earth carbonate decomposing under the effect of the heat in an endothermic reaction; and
   an upper level comprising a cover.

2. The chamber for reacting exothermic material as claimed in claim 1, wherein the alkaline-earth carbonate is CaCO₃.

3. The chamber for reacting exothermic material as claimed in claim 1, wherein the material stored is a carbide of plutonium and/or uranium.

4. The chamber for reacting exothermic material as claimed in claim 2, wherein the reactive load furthermore comprises a plurality of different types of carbonates, so as to adjust the temperature range of the thermal decomposition of the reactive load.

5. The chamber for reacting exothermic material as claimed in claim 1, wherein the reactive load furthermore comprises carbon.

6. The chamber for reacting exothermic material as claimed in claim 1, wherein the receptacle of the chamber is made of a refractory metallic material which is of stainless steel.

7. The chamber for reacting exothermic material as claimed in claim 1, further comprising a mesh serving to support the reactive load and sieve it during the decomposition of said load, the reactive load being positioned in contact with said mesh.

8. The chamber for reacting exothermic material as claimed in claim 7, wherein the reactive load is a monolithic block positioned on said mesh.

9. The chamber for reacting exothermic material as claimed in claim 7, wherein the reactive load is distributed in various slabs positioned on said mesh.

10. The chamber for reacting exothermic material as claimed in claim 7, wherein the reactive load is distributed in the form of granules, the particle size of the granules being larger than the size of the apertures in said mesh.

11. The chamber for reacting exothermic material as claimed in claim 1, further comprising a chemically inert intermediate plate (5) providing a seal between the reactive load and the upper level.

12. The chamber for reacting exothermic material as claimed in claim 11, wherein the intermediate plate is made of tungsten.

13. The chamber for reacting exothermic material as claimed in claim 1, further comprising means for applying an isostatic pressure to the reactive load.

14. The chamber for reacting exothermic material as claimed in claim 13, wherein the means for applying an isostatic pressure to the reactive load are integrated into the upper level and take the form of two plates between which springs are inserted.

15. The chamber for reacting exothermic material as claimed in claim 13, wherein the means for applying an isostatic pressure to the reactive load comprise a weight.

16. The chamber for reacting exothermic material as claimed in claim 1, wherein the median and upper levels coincide, the chamber comprising two upper shutters securely fastened to the receptacle and capable of closing said container, said shutters containing the alkaline-earth carbonate.

17. The chamber for reacting exothermic material as claimed in claim 1, wherein the median level comprises a reactive load containing alkaline-earth carbonate granules.

* * * * *